United States Patent [15] 3,678,017
Shelton et al. [45] July 18, 1972

[54] INHIBITING PREMATURE VULCANIZATION OF RUBBERS

[72] Inventors: James R. Shelton, East Cleveland; Roger J. Hopper, Akron, both of Ohio

[73] Assignee: The Goodyear Tire & Rubber Company, Akron, Ohio

[22] Filed: April 7, 1970

[21] Appl. No.: 26,431

[52] U.S. Cl. ...................... 260/79.5 B, 260/5, 260/79.5 A, 260/239, 260/243, 260/247.1, 260/293.63, 260/293.64, 260/293.69, 260/293.73, 260/293.85, 260/326.82, 260/556 A, 260/556 AR, 260/556 N, 260/785, 260/780, 260/786, 260/793, 260/797
[51] Int. Cl. .................. C08f 27/06, C08c 11/60, C08c 11/54
[58] Field of Search .................. 260/79.5 R, 79.5 B, 769, 780, 260/243 R, 301, 556 A, 556 AR, 556 S, 556 N

[56] References Cited

UNITED STATES PATENTS 2,653,155  9/1953  Kittleson .......................... 260/326
3,341,403  9/1967  Klauke ............................. 260/301

FOREIGN PATENTS OR APPLICATIONS 164,670   8/1964   U.S.S.R. ............................ 260/780
922,367   3/1963   Great Britain ..................... 260/79.5
951,719  10/1956   Germany ............................ 260/79.5

OTHER PUBLICATIONS

Ash, A.S.F. et al., Chem. Soc. London J. (QD1.C6), 1952, pgs.

Primary Examiner—Joseph L. Schofer
Assistant Examiner—C. A. Henderson, Jr.
Attorney—F. W. Brunner and J. A. Rozmajzl

[57] ABSTRACT

Retarders of premature vulcanization of rubber, said retarders including N-alkylthio or N-arylthio sulfonamides and N-alkylthio or N-arylthio sulfamides, e.g., N-(n-butyl thio)-N-methyl-methanesulfonamide.

16 Claims, No Drawings

INHIBITING PREMATURE VULCANIZATION OF RUBBERS

This invention relates to an improved vulcanizing process for rubber and to the rubber stocks obtained by using this improved process. The invention relates to improved accelerator-inhibitor combinations for rubber. The invention also relates to new compounds useful as inhibitors of premature vulcanization in rubber. More particularly the invention relates to a method for preventing the premature vulcanization of rubber stocks and to the rubber stocks obtained by using this method.

Scorching during the processing of rubber is due to the premature or incipient vulcanization which may occur during any of the steps involved in the processing prior to the final vulcanization step, or during storage between said processing steps. Whereas a properly compounded unscorched rubber formulation can be die-extruded or sheeted from a calendar smoothly and without lumping, a scorched material often becomes wavy and lumpy after extrusion or sheeting, and must be discarded.

An object of the present invention is to provide a method of inhibiting premature vulcanization of rubber. Another object of the present invention is to provide scorch inhibitors and retarders for use in rubber processing.

According to the present invention there is provided a method of inhibiting premature vulcanization of rubber containing a vulcanizing agent and an organic vulcanization accelerating agent which comprises incorporating therein in an amount effective to inhibit premature vulcanization, a compound selected from the group of retarders having the following structural formulas:

$$R-SO_2-N-R^1$$
$$\phantom{R-SO_2-N-}|$$
$$\phantom{R-SO_2-N-}S$$
$$\phantom{R-SO_2-N-}|$$
$$\phantom{R-SO_2-N-}R^2 \qquad (I)$$

and $$R-SO_2-N-R^3-N-SO_2-R$$
$$\phantom{R-SO_2-N-}|\phantom{R^3-N-}|$$
$$\phantom{R-SO_2-N-}S\phantom{R^3-N-}S$$
$$\phantom{R-SO_2-N-}|\phantom{R^3-N-}|$$
$$\phantom{R-SO_2-N-}R^2\phantom{R^3-N-}R^2 \qquad (II)$$

wherein $R^1$ and $R^2$ are selected from the group consisting of substituted, e.g., with one or more halo, nitro, hydroxy or alkoxy groups, and unsubstituted, saturated and unsaturated hydrocarbon groups containing preferably one to 20 carbon atoms. R is selected from the group consisting of $R^1$, $R^2$ and

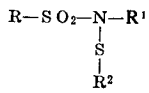

wherein $R^4$ and $R^5$ are selected from the group consisting of hydrogen, $R^1$ and $R^2$, and $R^4$ and $R^5$ can be joined through a member of the group consisting of $-CH_2-$, $-O-$, $-NH-$ and $-S-$ to constitute with the attached nitrogen atoms a heterocyclic radical and wherein $R^3$ is a hydrocarbon radical, substituted or unsubstituted, saturated or unsaturated containing one to 20 carbon atoms and wherein R and $R^1$ can be joined through a $-CH_2-$ group to constitute with the $-SO_2-N-$ group a heterocyclic radical.

The R's described herein, i.e., R, $R^1$, $R^2$, $R^3$, $R^4$ and $R^5$ may all be different in a particular compound. For example, although R is selected from the group consisting of $R^1$, $R^2$, etc., for a specific compound, R may be methyl, while $R^1$ is ethyl and $R^2$ is benzyl. Also, two R groups or two $R^1$ groups or two $R^2$ groups within a compound need not be the same.

Preferred compounds include those where $R^1$ and $R^2$ are radicals selected from the group consisting of alkyl (one to 20 carbon atoms), cycloalkyl (five to 20 carbon atoms) including alkyl substituted cycloalkyls, aralkyl (seven to 20 carbon atoms), haloalkyl (one to 20 carbon atoms) such as chloroalkyl, aryl (six to 20 carbon atoms), alkylaryl (seven to 20 carbon atoms), haloaryl (six to 20 carbon atoms), such as chloroaryl, nitroaryl (six to 20 carbon atoms), alkoxyaryl (seven to 20 carbon atoms) and alkenyl (three to 20 carbon atoms) wherein R is selected from the group consisting of the preferred $R^1$ and $R^2$ radicals described above and

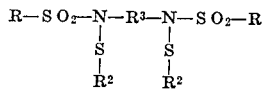

, wherein when R is

, $R^4$ and $R^5$ are selected from the group consisting of the preferred $R^1$ and $R^2$ radicals described above or $R^4$ and $R^5$ are joined to form a ring selected from the group consisting of morpholino, piperidino and pyrrolidino rings.

Preferably $R^3$ is selected from the group consisting of alkylene radicals (one to six carbon atoms), cycloalkylene radicals (five to seven carbon atoms) and arylene radicals (six to 20 carbon atoms).

When R and $R^1$ are joined to form, along with the $-SO_2-N-$ group, a heterocyclic ring, preferably the remainder of the ring is a hydrocarbon containing three to 12 carbon atoms, e.g., to form a sultam ring. For example, R and $R^1$ may join to form a trimethylene or tetramethylene group.

One embodiment involves compounds where $R^2$ is monohaloalkyl (one to 12 carbon atoms), preferably a monochloroalkyl. Examples of such radicals include 1—(2—chlorobutyl)— and 2—(1—chlorobutyl)—.

Most preferred are the retarders wherein R is selected from the group consisting of methyl, ethyl, isopropyl, n-butyl, t-butyl and other alkyls having from one to six carbon atoms, phenyl, p-tolyl, p-chlorophenyl, dimethylamino, morpholino, piperidono and trichloromethyl radicals; wherein $R^1$ is selected from the group consisting of methyl, ethyl, isopropyl, n-butyl, t-butyl and other alkyls having from one to six carbon atoms, cyclohexyl, phenyl, p-tolyl, p-chlorophenyl and allyl radicals and wherein $R^2$ is selected from the group consisting of methyl, ethyl, isopropyl, n-butyl, t-butyl and other alkyls having from one to six carbon atoms including monochloroalkyls, benzyl, cyclohexyl, 2-chlorocyclohexyl, phenyl, p-tolyl, p-chlorophenyl and allyl radicals. Where the retarder has a structural formula according to structural formula II, preferably $R^3$ is an alkylene radical, e.g., methylene, ethylene and propylene, a cycloalkylene, e.g., 1,2-cyclohexylene or an arylene, e.g., p-phenylene.

The following compounds are intended to illustrate but not to limit the retarders of the present invention.

N-(methylthio)-N,N',N'-trimethylsulfamide
N-(n-butylthio)-N,N',N'-trimethylsulfamide
N-(cyclohexylthio)-N,N',N'-trimethylsulfamide
N-(t-butylthio)-N,N',N'-trimethylsulfamide
N-(phenylthio)-N,N',N'-trimethylsulfamide
N-cyclohexyl-N-(n-butylthio)-N',N'-dimethylsulfamide
N-cyclohexyl-N-(cyclohexylthio)-N',N'-dimethylsulfamide
N-cyclohexyl-N-(phenylthio)-N',N'-dimethylsulfamide
N-phenyl-N-(ethylthio)-N',N'-diethylsulfamide
N-(p-chlorophenyl)-N-(phenylthio)-N', N'-dimethylsulfamide
N-isopropyl-N-(benzylthio)-N',N'-diethylsulfamide
N-(p-tolylthio)-N,N',N'-trimethylsulfamide
N-(cyclohexylthio)-N-ethyl-N', N'-dimethylsulfamide
N',N'-diphenyl-N-(p-tolyl)-N-(hexylthio)-sulfamide
N-(p-tolyl)-N-(p-chlorophenylthio)-N',N'-dimethylsulfamide
N-(n-butylthio)-N-methyl-4-morpholinesulfonamide
N-(n-butylthio)-N-methyl-1-piperidinesulfonamide
N-(p-chlorophenylthio)-N-(n-propyl)-2,6-dimethyl-4-morpholinesulfonamide
N-(n-butyl)-N-(4-t-butylphenylthio)-1-pyrrolidinesulfonamide
N-(3-nitrophenylthio)-N,N',N'-trimethylsulfamide
N,N'-di(n-butylthio)-N,N'-ethylenebis(p-toluenesulfonamide)
N,N'-di(phenylthio)-N,N'-p-phenylenebis(methanesulfonamide)
N-(2-chlorocyclohexylthio)-N-methyl-p-toluenesulfonamide
N-(2-chloro-1-butylthio)-N-methyl-methanesulfonamide
N-(2-chloroethylthio)-N,N',N'-trimethylsulfamide N-(cyclohexylthio)-N-methyl-methanesulfonamide
N-(n-butylthio)-N-methyl-methanesulfonamide
N-(t-butylthio)-N-methyl-methanesulfonamide
N-(isopropylthio)-N-methyl-methanesulfonamide
N-(methylthio)-N-methyl-methanesulfonamide
N-(phenylthio)-N-methyl-methanesulfonamide
N-(benzylthio)-N-methyl-methanesulfonamide
N-(ethylthio)-N-methyl-methanesulfonamide
N-(p-tolylthio)-N-methyl-methanesulfonamide
N-(p-chlorophenylthio)-N-methyl-methanesulfonamide
N-(p-nitrophenylthio)-N-methyl-methanesulfonamide
N-(n-butylthio)-N-(n-butyl)-methanesulfonamide
N-(benzylthio)-N-(n-butyl)-methanesulfonamide
N-(n-butylthio)-N-cyclohexyl-methanesulfonamide
N-(phenylthio)-N-cyclohexyl-methanesulfonamide
N-(phenylthio)-N-phenyl-methanesulfonamide
N-(dodecylthio)-N(p-chlorophenyl)-methanesulfonamide
N-hexylthio-N-(p-nitrophenyl)-methanesulfonamide
N-octylthio-N-(p-methoxyphenyl)-methanesulfonamide
N-(p-methoxyphenyl)N-ethyl-methanesulfonamide
N-(benzylthio)-N-propyl-ethanesulfonamide
N-(p-t-butylphenylthio)-N-(n-butyl)-propanesulfonamide
N-(p-tolylthio)-N-(p-tolyl)-3-chloropropanesulfonamide
N-(n-butylthio)-N-(n-butyl)-butanesulfonamide
N-(benzylthio)-N-(benzyl)-α-toluenesulfonamide
N-(n-butylthio)-N-cyclohexyl-benzenesulfonamide
N-(benzylthio)-N-methyl-benzenesulfonamide
N-(methylthio)-N-methyl-p-toluenesulfonamide
N-(isopropylthio)-N-methyl-p-toluenesulfonamide
N-(n-butylthio)-N-methyl-p-toluenesulfonamide
N-(cyclohexylthio)-N-methyl-p-toluenesulfonamide
N-(benzylthio)-N-isopropyl-p-toluenesulfonamide
N-(phenylthio)-N-methyl-p-toluenesulfonamide
N-(n-octylthio)-N-t-butyl-p-chlorobenzenesulfonamide
N-(sec-butylthio)-N-methyl-p-nitrobenzenesulfonamide
N-allylthio-N-allyl-p-toluenesulfonamide
N-benzylthio-N-allyl-p-toluenesulfonamide
N-phenylthio-δ-butanesultam
N-(n-butylthio)-δ-butanesultam
N-benzylthio-δ-butanesultam
N-(p-chlorophenylthio)-δ-butanesultam
N-ethylthio-γ-propanesultam
N-(p-nitrophenylthio-γ-propanesultam
N-cyclohexylthio-γ-propanesultam
N-methylthio-γ-propanesultam
N-phenylthio-1,8-napthosultam
N,N'-di(phenylthio)-N,N'-(1,2-cyclohexylene)bis(benzenesulfonamide)
N,N'-di(methylthio)-N,N'-trimethylenebis(p-chlorobenzenesulfonamide)
N,N'-di(benzylthio)-N,N'-m-phenylenebis(methanesulfonamide)
N,N'-di(benzylthio)-N,N'-ethylenebis(p-toluenesulfonamide)
N,N'-di(p-tolylthio)-N,N'-hexamethylenebis(p-toluenesulfonamide)
N,N'-di(isopropylthio)-N,N'-p-phenylenebis(benzenesulfonamide)
2,9-dimethyl-4,7-di(phenylthio)-3,8-dithia-2,4,7,9-tetraaza-3,3,8,8-tetraoxo-decane Retarders of the present invention can be prepared by reaction of a sulfenyl chloride with an alkali metal salt of an appropriate sultam, sulfonamide or sulfamide. Alternatively, the sulfenyl chloride may be reacted with a sultam, sulfonamide or sulfamide in the presence of an organic acid acceptor such as pyridine or a trialkylamine. Generally, a solution of sulfenyl chloride in an inert solvent is added to a solution or suspension of the sultam, sulfonamide or sulfamide (or their alkali metal salts), also in an inert solvent. A description of the preparation of compounds of the type described herein, wherein the compounds contain an allylic group, is presented in an article entitled, "The Isomerization of Sulphilimines, Part II," Anthony S. F. Ash and Frederick Challenger, Journal of the Chemical Society, 1952, page 2792, London: The Chemical Society.

The performance of the compounds of the present invention as retarders is not dependent upon their method of preparation.

This invention is applicable to rubber mixes containing sulfur-vulcanizing agents, peroxide-vulcanizing agents, organic accelerators for vulcanization and antidegradants, neither being the inhibitor used. For the purposes of this invention, sulfur-vulcanizing agent means elemental sulfur or sulfur containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexyl sulfenamide, 2-mercaptobenzothiazole, N-tert-butyl-2-benzothiazole sulfenamide, 2-benzothiazolyl diethyldithiocarbamate and 2-(morpholinothio)benzothiazole can be used. Other thiazole accelerators which may be used include 2-(aminodithio)-thiazoles and 2-(aminotrithio)-thiazoles such as 2-morpholinodithio)-benzothiazole. Amine salts of mercaptobenzothiazole accelerators for example, the t-butyl amine salt of mercaptobenzothiazole, and like salts of morpholine and 2,6-dimethyl morpholine can be used in the invention. Thiazole accelerators other than aromatic can be used. Stocks containing accelerators, for example tetramethylthiuram disulfide, tetramethylthiuram monosulfide, aldehyde amine condensation products, thiocarbamylsulfenamides, thioureas, xanthates, and guanidine derivatives are substantially improved using the process of our invention.

The inhibitors of the invention can be used in natural and synthetic rubbers and mixtures thereof. Synthetic rubbers that can be improved by the process of this invention include cis-1,4-polybutadiene, butyl rubber, ethylene-propylene terpolymers, polymers of 1,3-butadienes, for example, 1,3-butadiene itself and of isoprene, copolymers of 1,3-butadiene with other monomers, for example, styrene, acrylonitrile, isobutylene and methyl methacrylate. Ethylene propylene terpolymers, for example ethylene/propylene/dicyclopentadiene terpolymers can benefit from the present invention. The invention is of particular value with reference to the diene rubbers and the term "rubber" is used herein to include both diene rubber and other rubbers.

The following Examples 1 to 6 illustrate the preparation of various retarders which may be used within the practice of the present invention. These examples illustrate, but do not limit, the practice of the present invention.

EXAMPLE 1

To prepare N-cyclohexyl-N-(phenylthio)-methanesulfonamide, 0.22 mole of chlorine gas is passed into 250 ml. of a carbon tetrachloride solution containing 22 grams (0.20 mole) of thiophenol. The addition time for chlorine is about one-half hour. The reaction temperature is held at −20° C. during the addition. The resulting orange benzenesulfenyl chloride solution is then warmed to 0° C. and purged with nitrogen to remove hydrogen chloride gas. The sulfenyl chloride solution is added over a 50 minute period to a stirred mixture of 36.3 grams (0.205 mole) of N-cyclohexyl-methanesulfonamide and 30.3 grams (.30 mole) of triethylamine in 180 ml. of benzene at 10° to 15° C. After the addition, the reaction mixture is stirred an additional 50 minutes at room temperature and poured over 1 liter of water. The organic phase is subsequently washed three times with 200 ml. portions of water, dried over anhydrous sodium sulfate, filtered and stripped of solvents at reduced pressure. The residue is a viscous brown oil which deposits a white crystalline solid when mixed with n-octane. Filtration of the octane slurry gives 34.5 grams (60 percent) of product with a melting point of 82° to 83.5° C. Analysis of this product shows 22.9 percent sulfur and 5.01 percent nitrogen. Calculated percentages for $C_{13}H_{19}NO_2S_2$ are 22.5 percent sulfur and 4.91 percent nitrogen. The infrared and proton resonance spectra are consistent with the proposed structure.

EXAMPLE 2

To prepare N-(n-butylthio)-N-methyl-methanesulfonamide, 0.35 mole of chlorine gas is added over a one-half hour period to a solution of 0.35 mole (62.5 grams) of n-butyldisulfide in 550 ml. carbon tetrachloride at −20° to −10° C. The resulting n-butanesulfenyl chloride solution is then added over a 0.5 hour period to a suspension of 0.70 mole of the sodium salt of N-methyl-methanesulfonamide in 400 ml. of toluene, keeping the temperature at 30° C. The reaction mixture is stirred for 1 hour after addition of the sulfenyl chloride and then washed three times with 1 liter portions of water. The organic layer is separated and dried over anhydrous sodium sulfate, filtered, and the toluene and carbon tetrachloride evaporated under reduced pressure at less than 60° C. The residue is a yellow to orange liquid, 136.5 grams (99 percent) which solidifies at −10° to −5° C. Recrystallization from diethyl ether gives a faintly yellow liquid with a melting point from −3° C. to −1° C. and a refractive index ($n_D^{20}$) of 1.4846. Gas chromatographic analysis shows greater than 97 percent purity. The infrared and proton resonance spectra are consistent with the proposed structure. Calculated percentages for $C_6H_{15}NO_2S_2$ are 7.10 percent nitrogen, 32.51 percent sulfur, 36.53 percent carbon, 7.66 percent hydrogen and 16.22 percent oxygen. An elemental analysis of the recrystallized product showed 7.12 percent nitrogen, 32.54 percent sulfur, 36.34 percent carbon and 7.67 percent hydrogen and thereby indirectly, 16.33 percent oxygen.

EXAMPLE 3

To prepare N-cyclohexylthio)-N,N',N'-trimethylsulfamide 0.35 mole of chlorine gas is added over a one-half hour period to a solution of 0.35 mole (80 grams) dicyclohexyldisulfide in 450 ml. of carbon tetrachloride at −20° to −10° C. The resulting cyclohexanesulfenyl chloride solution is added over a 20 minute period to a suspension of 0.70 mole of the sodium salt of N,N,N'-trimethylsulfamide in 200 ml. of toluene at 25° to 30° C. The reaction mixture is then stirred an additional 0.75 hour at 35° to 40° C. The product is washed three times with 1 liter portions of water, and the organic phase separated, dried over anhydrous sodium sulfate, and filtered. The solvents are removed under reduced pressure, leaving 174 grams (99 percent) of a pale yellow liquid, with a melting point of about 0° C. This product is recrystallized in petroleum ether to give a faintly yellow liquid, having a melting point of 10° to 13° C. Analysis of the recrystallized product shows 10.89 percent nitrogen. The calculated percentage for $C_9H_{20}N_2O_2S_2$ is 11.10 percent nitrogen. Gas chromatographic analysis shows greater than 99 percent purity. The infrared and proton resonance spectra are consistent with the proposed structure.

EXAMPLE 4

To prepare N-(n-butylthio)-N-methyl-p-toluenesulfonamide, a solution of 0.25 mole of n-butanesulfenyl chloride in 300 ml. of carbon tetrachloride is prepared in a manner analogous to Example 1. This solution is then added to a suspension of 0.27 mole of the sodium salt of N-methyl-p-toluenesulfonamide in 170 ml. of toluene over a one-half hour period at 28° to 31° C. After addition of the sulfenyl chloride, the mixture is stirred for 1 hour at 28° C. The reaction mixture is washed with 1 liter of a 3 percent sodium hydroxide solution, then three times with 1 liter portions of water. The organic phase is separated, dried over anhydrous sodium sulfate, filtered, and stripped of solvents under reduced pressure. A light yellow liquid residue, 63 grams (91 percent) is obtained. This material solidifies on cooling, and has a melting point of about 25° to 30° C. Recrystallization from petroleum ether gives a white crystalline product, having a melting point of 33° to 34° C. Analysis of the recrystallized sample shows 5.03 percent nitrogen. The calculated percentage for $C_{12}H_{19}NO_2S_2$ is 5.07 percent nitrogen.

EXAMPLE 5

To prepare N-(p-tolylthio)-N-methyl-methanesulfonamide, 40.4 grams (0.30 mole) of freshly distilled sulfuryl chloride is added to a solution of 73.9 grams (0.30 mole) of p-tolyl disulfide in 200 ml. dichloromethane, keeping the temperature below 20° C. After the addition, the solution is stirred for 1 hour. The solvent is then removed under reduced pressure. p-Toluenesulfenyl chloride, a red liquid, is obtained in substantially quantitative yield. This sulfenyl chloride is added to a toluene suspension of 0.32 mole of the sodium salt of N-methyl-methanesulfonamide over a ½ hour period at 30° C. The mixture is then stirred an additional 2 hours at room temperature, and washed three times with 500 ml. portions of water. The organic layer is separated, dried over anhydrous sodium sulfate, filtered, and the toluene evaporated under reduced pressure. The residue weighs 61 grams (88 percent) and is a light yellow solid. The solid is recrystallized from diethyl ether to give a white crystalline product having a melting point of 73° to 74° C. Analysis shows 5.72 percent nitrogen. The calculated nitrogen for $C_9H_{13}NO_2S_2$ is 6.06 percent.

EXAMPLE 6

To prepare N-(benzylthio)-N-methyl-benzenesulfonamide, 0.13 mole of chlorine gas is added over a ½ hour period to a solution of 31 grams (0.13 mole) benzyl disulfide in 300 ml. of carbon tetrachloride at 0° C. The resulting phenylmethanesulfenyl chloride solution is then added over a ½ hour period to a suspension of 0.28 mole of the sodium salt of N-methyl-benzenesulfonamide at a temperature of from 0° to 5° C. After addition of the sulfenyl chloride, the reaction mixture is stirred 2 hours at 25° to 30° C. The mixture is then washed with 1 liter of 3 percent sodium hydroxide, followed by washing three times with 1 liter portions of water. The organic layer is separated, dried over anhydrous sodium sulfate, filtered, and the solvents removed under reduced pressure. The residue is 65.2 grams (88 percent) of orange liquid which solidifies on standing. Recrystallization from carbon tetrachloride gives a white crystalline solid with a melting point of 71° to 72° C. Analysis shows 22.0 percent sulfur and 4.73 percent nitrogen. Calculated percentages for $C_{14}H_{15}NO_2S_2$ are 21.8 percent sulfur and 4.78 percent nitrogen.

The other compounds included within the practice of the present invention can be prepared by using the same or similar techniques as described in the preceding working examples. Synthetic routes to these compounds are not limited however to these particular reactions and procedures.

Tables I to IX illustrate the use of the retarders with a variety of rubber stocks and accelerator systems. The compositions are intended only to be illustrative of the practice of the present invention and not limiting. The numbers immediately preceding or following the components of the compositions are parts by weight. Unless otherwise indicated, all parts are parts by weight. Mooney Scorch tests were performed using the large rotor as described in ASTM D 1646—61. A recorder was employed to continuously plot viscosity versus time. The number of minutes ($t_5$) required for the viscosity curve to rise 5 points above the minimum was taken as a measure of scorch inhibition. Larger values for $t_5$ indicate a greater resistance to scorch or premature vulcanization.

Supplementary data on scorch delay and vulcanizing characteristics were obtained with a Monsanto Oscillating Disc Rheometer, as described by Decker, Wise, and Guerry in Rubber World, page 68, Dec. 1962. Pertinent data from this instrument are: $t_4$, the minutes required for the Rheometer torque curve to rise 4 units above the minimum torque value, and $t_{90}$, the minutes required for the torque curve to reach 90 percent of the difference between the maximum and minimum torque values.

The time, $t_4$, serves as a measure of scorch delay similar to $t_5$ from the Mooney scorch measurement. The $t_{90}$ value is considered to be the time required to reach the optimum vulcanized state. The difference, $(t_{90} - t_4)$ is indicative of the time necessary for actual vulcanization to take place after the scorch delay period has ended, i.e., is a relative measure of vulcanization rate. Scorch inhibitors which increase $t_4$, but do not greatly increase $(t_{90} - t_4)$ are preferred since these impart processing safety, yet do not require greatly extended vulcanization times.

The tensile strength, elongation, and 300 percent modulus were obtained according to standard test procedures wherein dumbbell samples were died from vulcanized sheets and tested in a conventional tensile tester. This procedure is more fully described in "New Autographic Machine for Testing Tensile Properties of Rubber," by G. J. Albertoni, Industrial and Engineering Chemistry, Analytical Edition, Vol. 3, p 236, 1931. Test stocks were vulcanized either for arbitrary times of 15, 30, 60 and 120 minutes, or for the times $t_{90}$ and $2(t_{90})$ as determined from the Rheometer curves.

Table I illustrates the use of N-(n-butylthio)-N-methylmethanesulfonamide and N-(cyclohexylthio)-N,N',N'-trimethylsulfamide as scorch inhibitors in natural rubber stocks accelerated by 2-(morpholinothio)-benzothiazole.

TABLE I

Components and Parts, Common to All Stocks

- 100 Natural Rubber
- 50 High Abrasion Furnace Black
- 3.0 Hydrocarbon Softener
- 3.0 Stearic Acid
- 3.0 Zinc Oxide
- 1.0 Amine Type Age Resister
- 2.5 Sulfur
- 0.5 2-(Morpholinothio)-benzothiazole

| Retarders: A | | Stocks B | C | D | E | F | G |
|---|---|---|---|---|---|---|---|
| N-(n-butylthio)-N-methyl methanesulfonamide— | | 0.25 | 0.50 | 1.00 | — | — | — |
| N-(cyclohexylthio)-N,N', N'-trimethylsulfamide— | | — | — | — | 0.25 | 0.50 | 1.00 |
| Mooney Scorch at 121° C. | $t_5$ 27.2 | >46 | >46 | >60 | 31.3 | 36.9 | 52.4 |
| Monsanto Rheometer at 135° C: | | | | | | | |
| | $t_4$ 15.4 | 28.3 | 34.6 | 50.2 | 17.5 | 19.5 | 29.2 |
| | $t_{90}$ 43.3 | 60.3 | 67.2 | 85.6 | 50.0 | 54.9 | 70.9 |
| $(t_{90}-t_4)$ | 27.9 | 32.0 | 32.6 | 35.4 | 32.5 | 35.4 | 41.7 |

Physical Properties Vulcanized at 135°C. for Time (min.) Shown:

Tensile Strength, psi

| | | | | | | | |
|---|---|---|---|---|---|---|---|
| 15 | 2600 | 600 | 530 | 500 | 1600 | 900 | 710 |
| 30 | 3500 | 3460 | 2200 | 740 | 3740 | 3430 | 1950 |
| 60 | 3600 | 3560 | 3740 | 3700 | 3790 | 3550 | 4050 |
| 120 | 3590 | 3600 | 3400 | 3400 | 3360 | 3360 | 3460 |

Elongation, %

| | | | | | | | |
|---|---|---|---|---|---|---|---|
| 15 | 590 | 570 | 580 | 630 | 575 | 520 | 580 |
| 30 | 520 | 585 | 560 | 640 | 565 | 555 | 515 |
| 60 | 460 | 475 | 500 | 540 | 480 | 480 | 510 |
| 120 | 465 | 450 | 440 | 430 | 435 | 445 | 460 |

300% Modulus, psi

| | | | | | | | |
|---|---|---|---|---|---|---|---|
| 15 | 1020 | 170 | 170 | 140 | 560 | 325 | 220 |
| 30 | 1925 | 1550 | 860 | 210 | 1960 | 1660 | 790 |
| 60 | 2330 | 2260 | 2300 | 2010 | 2475 | 2250 | 2470 |
| 120 | 2300 | 2375 | 2360 | 2340 | 2275 | 2280 | 2225 |

Both test compounds showed a high degree of effectiveness as scorch inhibitors. N-(n-butylthio)-N-methyl-methanesulfonamide was particularly effective since it gave a large scorch delay with only a small increase in actual vulcanization time $(t_{90}-t_4)$. From the data, t is evident that these inhibitors have virtually no detrimental effect on the ultimate physical properties of the vulcanized stocks.

The stocks described in Tables II, III and IV all contained the following components:

| Components | Parts |
|---|---|
| Natural Rubber | 100 |
| High Abrasion Furnace Black | 50 |
| Hydrocarbon Softener | 3 |
| Stearic Acid | 3 |
| Zinc Oxide | 3 |
| Amine Type Age Resister | 1 |
| Sulfur | 2.5 |
| 2-(morpholinodithio)-benzothiazole | 0.5 |

TABLE II

| Retarders: | | Stocks A | B | C |
|---|---|---|---|---|
| N-(n-butylthio)-N,N',N'-trimethyl sulfamide | | — | 1.0 | — |
| N-(n-butylthio)-N-methyl methanesulfonamide | | — | — | 1.0 |
| Mooney Scorch at 121° C. | $t_5$ | 24.2 | 57.4 | >60 |
| Monsanto Rheometer at 135° C. | $t_4$ | 14.0 | 24.0 | 31.0 |
| | $t_{90}$ | 50.5 | 70.4 | 73.0 |
| | $(t_{90}-t_4)$ | 36.5 | 46.4 | 42.0 |

Physical Properties Vulcanized at 135°C. for Time (min.) Shown:

Tensile Strength, psi

| | | | |
|---|---|---|---|
| 15 | 2350 | 575 | 500 |
| 30 | 3700 | 2025 | 1875 |
| 60 | 3650 | 3650 | 3510 |
| 120 | 3500 | 3700 | 3375 |

Elongation, %

| | | | |
|---|---|---|---|
| 15 | 620 | 600 | 580 |
| 30 | 560 | 560 | 555 |
| 60 | 460 | 510 | 485 |
| 120 | 450 | 465 | 420 |

300% Modulus, psi

| | | | |
|---|---|---|---|
| 15 | 700 | 180 | 150 |
| 30 | 1580 | 700 | 650 |
| 60 | 2100 | 2025 | 2050 |
| 120 | 2225 | 2360 | 2275 |

From Table II it is seen that N-(n-butylthio)-N,N',N'-trimethyl sulfamide and N-(n-butylthio)-N-methyl-methanesulfonamide are effective inhibitors when used with the accelerator 2-(morpholinodithio)-benzothiazole.

TABLE III

| Retarders: | | Stocks A | B | C | D | E |
|---|---|---|---|---|---|---|
| N-(benzylthio)-N-methyl-benzenesulfonamide | | — | 0.5 | 1.0 | — | — |
| N-(n-butylthio)-N-(n-butyl)-methanesulfonamide | | — | — | — | 0.5 | — |
| N-(benzylthio)-N-isopropyl-p-toluenesulfonamide | | — | — | — | — | 0.5 |
| Mooney Scorch at 121° C. | $t_5$ | 24.6 | 36.6 | 47.8 | 39.8 | 32.4 |
| Monsanto Rheometer at 135° C. | $t_4$ | 14.3 | 21.9 | 28.0 | 21.4 | 18.8 |
| | $t_{90}$ | 46.9 | 58.2 | 67.8 | 57.5 | 54.1 |
| | $(t_{90}-t_4)$ | 32.6 | 36.3 | 39.8 | 36.1 | 35.3 |

Physical Properties Vulcanized at 135°C. for Time (min.) Shown:

Tensile Strength, psi

| | | | | | |
|---|---|---|---|---|---|
| 15 | 2640 | 750 | 580 | 760 | 820 |
| 30 | 3600 | 3590 | 3060 | 3460 | 3725 |
| 60 | 3590 | 3800 | 3750 | 3600 | 3780 |
| 120 | 3525 | 3240 | 3450 | 3500 | 3475 |

Elongation, %

| | | | | | |
|---|---|---|---|---|---|
| 15 | 605 | 560 | 585 | 615 | 565 |
| 30 | 565 | 585 | 615 | 605 | 605 |
| 60 | 485 | 490 | 510 | 490 | 500 |
| 120 | 485 | 425 | 465 | 470 | 455 |

300% Modulus, psi

| | | | | | |
|---|---|---|---|---|---|
| 15 | 950 | 250 | 180 | 220 | 260 |
| 30 | 1760 | 1640 | 1170 | 1440 | 1610 |
| 60 | 2180 | 2350 | 2200 | 2160 | 2220 |
| 120 | 2130 | 2210 | 2200 | 2125 | 2200 |

TABLE IV

| Retarders: | | Stocks A | B | C | D |
|---|---|---|---|---|---|
| N-(n-butylthio)-N-methyl-p-toluenesulfonamide | | — | 0.5 | — | — |
| N-(p-tolylthio)-N-methyl-methanesulfonamide | | — | — | 0.5 | — |
| N-(n-butylthio)-N-methyl-4-morpholine sulfonamide | | — | — | — | 0.5 |
| Mooney Scorch at 121° C. | $t_5$ | 27.2 | 44.8 | 43.1 | 41.2 |

| Monsanto Rheometer at 135° C. | | | | |
|---|---|---|---|---|
| $t_4$ | 15.5 | 23.8 | 23.5 | 26.0 |
| $t_{90}$ | 52.5 | 62.0 | 59.5 | 66.5 |
| $(t_{90}-t_4)$ | 37.0 | 38.2 | 36.0 | 40.5 |

Physical Properties Vulcanized at 135°C. for Time (min.) Shown:

| Tensile Strength, psi | | | | |
|---|---|---|---|---|
| 15 | 3270 | 1060 | 490 | 750 |
| 30 | 3690 | 3590 | 3290 | 3510 |
| 60 | 3600 | 3400 | 3580 | 3560 |
| 120 | 3330 | 3390 | 3450 | 3350 |

| Elongation, % | | | | |
|---|---|---|---|---|
| 15 | 630 | 600 | 565 | 595 |
| 30 | 570 | 585 | 575 | 610 |
| 60 | 505 | 475 | 495 | 495 |
| 120 | 455 | 470 | 480 | 460 |

| 300% Modulus, psi | | | | |
|---|---|---|---|---|
| 15 | 1250 | 270 | 150 | 210 |
| 30 | 1825 | 1610 | 1580 | 1500 |
| 60 | 2100 | 2110 | 2150 | 2050 |
| 120 | 1975 | 2075 | 2100 | 2110 |

Tables III and IV provide additional examples of the use of inhibitors of this invention with natural rubber stocks accelerated by 2-(morpholinodithio)-benzothiazole.

The stocks used for Tables V and VI had the following components in common.

| Components | Parts |
|---|---|
| Oil Extended Styrene-butadiene Rubber 1712 | 137.5 |
| Intermediate Super Abrasion Furnace Black | 68 |
| Zinc Oxide | 5 |
| Stearic Acid | 2 |
| Amine Type Age Resister | 1.5 |
| Sulfur | 2.0 |

TABLE V

| | | | Stocks | | | | |
|---|---|---|---|---|---|---|---|
| Retarder: | A | B | C | D | E | F | G | H |
| N-(n-butylthio)-N-methyl-methanesulfonamide | — | 1.0 | — | 0.5 | — | 0.5 | — | 0.5 |
| Accelerator: | | | | | | | | |
| 2-(morpholinodithio)-benzothiazole | 1.2 | 1.2 | — | — | — | — | — | — |
| 2-(morpholinothio)-benzothiazole | — | — | 1.2 | 1.2 | — | — | — | — |
| N-cyclohexyl-2-benzo-thiazolesulfenamide | — | — | — | — | 1.2 | 1.2 | — | — |
| 2,2'-dithio bis-(benzothiazole) | — | — | — | — | — | — | 1.0 | 1.0 |
| Diphenyl guanidine | — | — | — | — | — | — | 0.75 | 0.75 |
| Mooney Scorch at 132° C. $t_5$ | 19.2 | 34.4 | 35.9 | 54.1 | 26.0 | 40.5 | 11.1 | 18.5 |
| Monsanto Rheometer at 143° C. $t_4$ | 16.5 | 27.0 | 30.0 | 41.5 | 21.5 | 33.0 | 10.9 | 18.5 |
| $t_{90}$ | 41.2 | 51.9 | 51.5 | 64.1 | 44.6 | 56.5 | 25.0 | 33.0 |
| $(t_{90}-t_4)$ | 24.7 | 24.9 | 21.5 | 23.6 | 23.1 | 23.5 | 14.1 | 14.5 |

Physical Properties Vulcanized at 143° C. for Time (min.) Shown:

| Tensile Strength, psi | | | | | | | | |
|---|---|---|---|---|---|---|---|---|
| $t_{90}$ | 3000 | 2940 | 2910 | 2860 | 2940 | 2930 | 2750 | 2760 |
| $2(t_{90})$ | 3010 | 3050 | 2820 | 2930 | 2950 | 3000 | 2675 | 2600 |

| Elongation, % | | | | | | | | |
|---|---|---|---|---|---|---|---|---|
| $t_{90}$ | 580 | 550 | 530 | 570 | 585 | 575 | 520 | 520 |
| $2(t_{90})$ | 525 | 515 | 470 | 515 | 520 | 525 | 440 | 435 |

| 300% Modulus, psi | | | | | | | | |
|---|---|---|---|---|---|---|---|---|
| $t_{90}$ | 1350 | 1370 | 1440 | 1290 | 1280 | 1340 | 1390 | 1375 |
| $2(t_{90})$ | 1580 | 1575 | 1650 | 1525 | 1550 | 1530 | 1660 | 1610 |

TABLE VI

| | | | Stocks | | | | |
|---|---|---|---|---|---|---|---|
| Retarders: | A | B | C | D | E | F | G | H |
| N-(p-tolylthio)-N-methyl methanesulfonamide | — | 1.0 | — | — | — | — | — | — |
| N-(n-butylthio)-N-methyl-p-toluenesulfonamide | — | — | — | 0.25 | 0.5 | — | 0.5 | 1.0 |
| Accelerators: | | | | | | | | |
| 2-(morpholinodithio)-benzothiazole | 1.2 | 1.2 | — | — | — | — | — | — |
| N-Cyclohexyl-2-benzothiazole-sulfenamide | — | — | 1.2 | 1.2 | 1.2 | — | — | — |
| 2,2'-dithiobis-(benzothiazole) | — | — | — | — | — | 1.0 | 1.0 | 1.0 |
| Diphenyl guanidine | — | — | — | — | — | 0.75 | 0.75 | 0.75 |
| Mooney Scorch at 132° C. $t_5$ | 19.2 | 29.3 | 26.0 | 31.1 | 37.3 | 11.1 | 16.3 | 26.4 |
| Monsanto Rheometer at 143° C. $t_4$ | 16.5 | 23.6 | 21.5 | 26.2 | 30.2 | 10.9 | 16.2 | 22.0 |
| $t_{90}$ | 41.2 | 46.2 | 44.6 | 49.2 | 53.1 | 25.0 | 31.5 | 38.3 |
| $(t_{90}-t_4)$ | 24.7 | 22.6 | 23.1 | 23.0 | 22.9 | 14.1 | 15.3 | 16.3 |

Physical Properties Vulcanized at 143° C. for Time (min.) Shown:

| Tensile Strength, psi | | | | | | | | |
|---|---|---|---|---|---|---|---|---|
| $t_{90}$ | 3000 | 3080 | 2940 | 2820 | 2950 | 2750 | 2530 | 2700 |
| $2(t_{90})$ | 3010 | 2850 | 2950 | 2940 | 2860 | 2675 | 2410 | 2700 |

| Elongation, % | | | | | | | | |
|---|---|---|---|---|---|---|---|---|
| $t_{90}$ | 580 | 600 | 585 | 540 | 575 | 520 | 470 | 525 |
| $2(t_{90})$ | 525 | 505 | 520 | 515 | 495 | 440 | 425 | 480 |

| 300% Modulus, psi | | | | | | | | |
|---|---|---|---|---|---|---|---|---|
| $t_{90}$ | 1350 | 1360 | 1280 | 1360 | 1400 | 1390 | 1410 | 1360 |
| $2(t_{90})$ | 1580 | 1480 | 1550 | 1525 | 1600 | 1660 | 1575 | 1510 |

Table V illustrates the use of N-(n-butylthio)-N-methyl methanesulfonamide in the styrene-butadiene rubber stock with four different accelerator systems. The data show the compound to be an excellent scorch inhibitor in all the test stocks. Significantly, neither the vulcanization times ($t_{90}-t_4$), nor the ultimate physical properties are altered to any great extent by the inhibitor.

In Table VI, the use of two additional scorch inhibitors in the styrene-butadiene rubber stock is illustrated. Again significant increases in scorch delay were obtained and accompanied by only small changes in ($t_{90}-t_4$) and the ultimate physical properties of the vulcanized stocks.

The data in Table VII show the effect of N-(n-butylthio)-N-methyl methanesulfonamide as a scorch inhibitor for a cis-1,4-polyisoprene polymer (>90 percent cis-1,4 content).

TABLE VII

Components and Parts, Common to All Stocks 100 cis-1,4-polyisoprene, 50 High Abrasion Furnace Black, 3 Hydrocarbon Softener, 3 Stearic Acid, 3 Zinc Oxide, 1 Amine Type Age Resister, 2.5 Sulfur

| | | | Stocks | | | |
|---|---|---|---|---|---|---|
| Retarder: | A | B | C | D | E | F | G |
| N-(n-butylthio)-N-methyl methanesulfonamide | — | 0.5 | 1.0 | — | 0.25 | 0.5 | 1.0 |
| Accelerator: | | | | | | | |
| 2(morpholinodithio)-benzothiazole | 0.5 | 0.5 | 0.5 | — | — | — | — |
| N-cyclohexyl-2-benzo-thiazolesulfenamide | — | — | — | 0.5 | 0.5 | 0.5 | 0.5 |
| Mooney Scorch at 121°C. $t_5$ | 22.1 | 39.6 | >60 | 22.8 | 40.5 | >60 | >60 |
| Monsanto Rheometer at 135° C. | | | | | | | |
| $t_4$ | 13.0 | 22.5 | 32.2 | 14.0 | 24.9 | 35.0 | 49.4 |
| $t_{90}$ | 34.8 | 49.8 | 64.1 | 33.5 | 46.8 | 59.1 | 76.0 |
| $(t_{90}-t_4)$ | 21.8 | 27.3 | 31.9 | 19.5 | 21.9 | 24.1 | 26.6 |

Physical Properties Vulcanized at 135° C. for Time (min.) Shown:

| Tensile Strength, psi | | | | | | | |
|---|---|---|---|---|---|---|---|
| $t_{90}$ 3600 | 3680 | 3730 | 3490 | 3775 | 3480 | 3530 |
| $2(t_{90})$ 3715 | 3530 | 3400 | 3550 | 3380 | 3580 | 3500 |
| Elongation, % | | | | | | | |
| $t_{90}$ 600 | 570 | 565 | 580 | 590 | 590 | 530 |
| $2(t_{90})$ 570 | 510 | 480 | 530 | 525 | 525 | 510 |
| 300% Modulus, psi | | | | | | | |
| $t_{90}$ 1450 | 1750 | 1650 | 1450 | 1625 | 1690 | 1680 |
| $2(t_{90})$ 1700 | 1900 | 1900 | 1680 | 1620 | 1760 | 1840 |

A substantial degree of inhibition is noted with two different accelerators. In general, the increases in vulcanization times ($t_{90}-t_4$) are small relative to the magnitudes of the scorch delay increases. The ultimate physical properties of the retarded stocks were comparable to or better than the control stocks.

The use of N-(benzylthio)-N-methyl-benzenesulfenamide in a blend of cis-1,4-polybutadiene (>90 percent cis-1,4 content) and natural rubber is shown in Table VIII.

TABLE VIII

Components and Parts, Common to All Stocks 90 cis-1,4-polybutadiene, 10 Natural Rubber, 50 Intermediate Super Abrasion Furnace Black, 10 Naphthenic Processing Oil, 3 1Zinc Oxide, 3 Stearic Acid, 1 Amine Type Age Resistor, 2.5 Sulfur

| | | | Stocks | | | |
|---|---|---|---|---|---|---|
| Retarder: | A | B | C | D | E | F |
| N-(benzylthio)-N-methyl benzenesulfonamide | — | 0.5 | 1.0 | — | 0.25 | 0.5 |
| Accelerator: | | | | | | |
| 2-(morpholinodithio)-benzothiazole | 0.5 | 0.5 | 0.5 | — | — | — |
| N-cyclohexyl-2-benzo-thiazolesulfenamide | — | — | — | 0.5 | 0.5 | 0.5 |
| Mooney Scorch at 132°C.$t_5$ | 17.7 | 22.4 | 26.7 | 14.1 | 20.7 | 25.9 |
| Monsanto Rheometer at 150° C.$t_4$ | 9.2 | 10.6 | 11.6 | 8.0 | 9.8 | 11.8 |
| $t_{90}$ | 24.1 | 26.2 | 27.5 | 22.7 | 23.8 | 24.8 |
| ($t_{90}-t_4$) | 14.9 | 15.6 | 15.9 | 14.7 | 14.0 | 13.0 |

Physical Properties Vulcanized at 150°C. for Time (min.) Shown:

| | | | | | | |
|---|---|---|---|---|---|---|
| Tensile Strength,psi$t_{90}$ | 2200 | — | 2550 | 2275 | — | 2375 |
| 2($t_{90}$) | 2090 | — | 2600 | 2160 | — | 2500 |
| Elongation, %$t_{90}$ | 605 | — | 660 | 765 | — | 725 |
| 2($t_{90}$) | 485 | — | 575 | 555 | — | 595 |
| 300% Modulus,psi$t_{90}$ | 660 | — | 700 | 525 | — | 550 |
| 2($t_{90}$) | 900 | — | 920 | 780 | — | 810 |

The retarder is effective with both accelerator systems illustrated. Vulcanization times ($t_{90}-t_4$) show little change in the presence of the retarder. The physical properties of the vulcanized stocks containing retarder appear to show a slight improvement over the controls.

Table IX serves to demonstrate that the scorch inhibitors of this invention may also be used in rubbers of the ethylene-propylene terpolymer (EPDM) type.

TABLE IX

Components and Parts, Common to All Stocks

100 EPDM (Nordel 1070), 80 Intermediate Super Abrasion Furnace Black, 50 Napthenic Softening Oil, 5 Zinc Oxide, 1.5 Tetramethyl thiuram Monosulfide, 0.5 2-Mercaptobenzothiazole, 1.3 Sulfur

| | | | | Stocks | | |
|---|---|---|---|---|---|---|
| Retarder: | | A | B | C | D | E |
| N-(n-butylthio)-N-methyl-methanesulfonamide | | — | 0.5 | 1.0 | — | — |
| N-(cyclohexylthio)-N,N',N'-trimethylsulfamide | | — | — | — | 0.5 | 1.0 |
| Mooney Scorch at 135° C. | $t_5$ | 16.0 | 19.7 | 30.5 | 20.9 | 25.8 |
| Monsanto Rheometer at 160°C. | $t_4$ | 7.1 | 8.3 | 11.4 | 9.0 | 10.5 |
| | $t_{90}$ | 14.3 | 16.0 | 20.3 | 17.1 | 18.8 |
| | ($t_{90}-t_4$) | 7.2 | 7.7 | 8.9 | 8.1 | 8.3 |

Physical Properties Vulcanized at 160° C. for Time (min.) Shown:

| | | | | | | |
|---|---|---|---|---|---|---|
| Tensile Strength, psi | $t_{90}$ | 2350 | 2440 | 2325 | 2300 | 2300 |
| | 2($t_{90}$) | 2470 | 2400 | 2390 | 2360 | 2310 |
| Elongation, % | $t_{90}$ | 730 | 780 | 805 | 735 | 740 |
| | 2($t_{90}$) | 575 | 660 | 700 | 630 | 645 |
| 300% Modulus,psi | $t_{90}$ | 450 | 450 | 450 | 500 | 460 |
| | 2($t_{90}$) | 860 | 670 | 650 | 700 | 730 |

The above examples are not intended to be limiting, but rather illustrative. Any of the retarders, accelerators and rubbers described earlier herein can be substituted in the preceding examples to obtain retardation effects. In addition the levels of the retarders and other components in said examples could be altered in accordance with the general teachings herein and retardation effects would be obtained. Peroxides, such as dicumyl peroxides, could also be used in said examples with or without the presence of sulfur and/or sulfur donating compounds.

Retarders within the practice of the present invention other than those described in the preceding examples have been synthesized and tested positively as retarders.

An SBR-1712 (oil-extended butadiene-styrene rubber) stock has also been tested with no sulfur present using 2-(morpholinodithio)-benzothiazole as both sulfur donor and accelerator using N-(n-butylthio)-N-methyl methanesulfonamide as the retarder. Although the stress-strain properties of the vulcanizate were adversely affected, positive retarding effects were obtained.

The retarders of this invention may be used at concentrations of from 0.10 part to 5.0 parts by weight of retarder per 100 parts by weight of rubber and even from 0.05 to 10.0 parts. Preferably the concentration ranges from 0.25 to 5.0 parts, more preferably from 0.25 to 3.0 parts and most preferably from 0.25 to 1.50 parts.

The retarders of the present invention are preferably added to the rubbery polymer at the same time that the accelerator is added, although this order of addition is not necessary to the successful utilization of the compounds of this invention.

The data in the preceding working examples are representative of the fact that the compounds of the present invention are effective as retarders in the presence of organic accelerators whether they are diaryl guanidines such as diphenylguanidine, or thiazoles, more specifically benzothiazyl amino disulfides, such as 2-morpholinodithio)-benzothiazole, or thiazoles (also sulfenamides), more specifically thiazolesulfenamides, and even more specifically benzothiazolesulfenamides such as 2-morpholinothio)-benzothiazole and N-cyclohexyl-2-benzothiazolesulfenamide, i.e., regardless of what type of organic accelerator is used. Thiuram sulfides such as tetramethyl thiuram monosulfide and disulfide and tetraethylthiuram monosulfide and disulfide may also be used as well as other benzothiazolesulfenamides such as N-(t-butyl)-2-benzothiazolesulfenamide.

Various organic accelerators useful within the practice of this invention are described and illustrated in the Vanderbilt Rubber Handbook, 1968 Edition, R. T. Vanderbilt Company, Inc., particularly at pages 242 to 244 and also in the bulletin of the Elastomer Chemicals Dept. of the E. I. du Pont de Nemours and Co. (Inc.) entitled, "Accelerators, Vulcanizing Agents and Retarders, Brochure No. SD A54457."

The polymers in which the retarders of the present invention are incorporated remain suitable for their art recognizing uses, e.g., in tires and industrial products.

While certain representative embodiments and details have been shown for the purpose of illustrating the invention, it will be apparent to those skilled in this art that various changes and modifications may be made therein without departing from the spirit or scope of the invention.

What is claimed is:

1. A composition comprising a vulcanizable rubber containing 0.10 part to 5.0 parts by weight per 100 parts by weight of rubber of at least one retarder selected from the group consisting of compounds having the following structural formulas

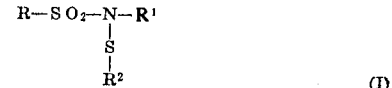

(I)

and

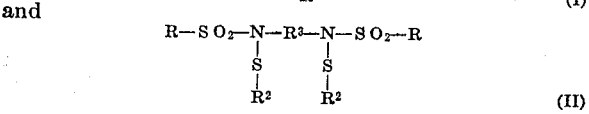

(II)

wherein R¹ and R² are selected from the group consisting of chloro, nitro, alkoxy and hydroxy substituted and unsubstituted, saturated and unsaturated hydrocarbon radicals containing one to 20 carbon atoms, wherein R is selected from the group consisting of R¹, R² and

, wherein R⁴ and R⁵ are selected from the group consisting of R¹ and R², and R⁴ and R⁵ can be joined through a member of the group consisting of — CH₂ — and — O — to constitute with the attached nitrogen atom a heterocyclic radical, and wherein R³ is selected from the group consisting of chloro, nitro, alkoxy and hydroxy substituted and unsubstituted, saturated and unsaturated hydrocarbon radicals containing one to 20 carbon atoms and wherein R and R¹ can be joined through a hydrocarbon group containing three to 12 carbon atoms to constitute with the — SO₂ — N — group a heterocyclic radical.

2. The composition according to claim 1 wherein the rubber contains a sulfur vulcanization agent.

3. The composition according to claim 2 wherein the rubber contains an organic vulcanization accelerating agent selected from the group consisting of thiazoles, diaryl guanidines and thiuram sulfides.

4. The composition according to claim 2 wherein R¹ and R² are radicals selected from the group consisting of alkyl radicals having from one to 20 carbon atoms, cycloalkyl radicals having from five to 20 carbon atoms, aralkyl radicals having from seven to 20 carbon atoms, chloroalkyl radicals having from one to 20 carbon atoms, aryl radicals having from six to 20 carbon atoms, alkylaryl radicals having from seven to 20 carbon atoms, chloroaryl radicals having from six to 20 carbon atoms, nitroaryl radicals having from six to 20 carbon atoms, alkoxyaryl radicals having from seven to 20 carbon atoms and alkenyl radicals having from three to 20 carbon atoms, wherein R is selected from the group consisting of R¹, R² and

, wherein R⁴ and R⁵ are selected from the group consisting of R¹ and R² or R⁴ and R⁵ are joined to form a ring selected from the group consisting of morpholino, piperidino and pyrrolidino rings, and wherein R³ is selected from the group consisting of alkylene radicals having from one to six carbon atoms, cycloalkylene radicals having from five to seven carbon atoms and arylene radicals having from six to 20 carbon atoms.

5. The composition according to claim 2 wherein R is selected from the group consisting of alkyl radicals having from one to six carbon atoms, phenyl, p-tolyl, p-chlorophenyl, dimethylamino, morpholino, and piperidino and radicals; wherein R¹ is selected from the group consisting of alkyl radicals having from one to six carbon atoms, cyclohexyl, phenyl, p-tolyl, p-chlorophenyl and allyl radicals and wherein R² is selected from the group consisting of alkyl radicals having from one to six carbon atoms, benzyl, cyclohexyl, 2-chlorocyclohexyl, phenyl, p-tolyl, p-chlorophenyl, 1-(2-chlorobutyl)-, 2-(1-chlorobutyl)-, and allyl radicals, wherein R³ is selected from the group consisting of methylene, ethylene, propylene, 1,2-cyclohexylene and p-phenylene radicals and wherein when R and R¹ are joined to form, along with the — SO₂ — N — group, a heterocyclic ring, R and R¹ are joined to form a radical selected from the group consisting of trimethylene and tetramethylene.

6. The composition according to claim 2 wherein R² is a monochloroalkyl radical having one to 12 carbon atoms.

7. The composition according to claim 5 wherein when R is an alkyl radical it is selected from the group consisting of methyl, ethyl, isopropyl, n-butyl and t-butyl radicals, when R¹ is an alkyl radical it is selected from the group consisting of methyl, ethyl, isopropyl, n-butyl and t-butyl radicals and when R² is an alkyl radical, it is selected from the group consisting of methyl, ethyl, isopropyl, n-butyl and t-butyl radicals.

8. The composition according to claim 2 wherein R is selected from the group consisting of phenyl and p-tolyl radicals, R¹ is selected from the group consisting of of methyl, ethyl, isopropyl and phenyl radicals and R² is an alkyl radical having from one to six carbon atoms.

9. The composition according to claim 2 wherein the retarder is selected from the group consisting of N-(n-butylthio)-N,N',N'-trimethylsulfamide; N-(cyclohexylthio)-N,N',N'-trimethylsulfamide; N-(2-chloro-1-butylthio)-N-methyl-methanesulfonamide; N-(n-butylthio)-N-methyl-methanesulfonamide; N-(methylthio)-N-methyl-p-toluenesulfonamide; and —N—(phenylthio)-N-methyl-p-toluenesulfonamide N-(n-butylthio)-N-methyl-p-toluenesulfonamide.

10. The composition according to claim 2 wherein the sulfur vulcanizing agent includes elemental sulfur.

11. The composition according to claim 2 wherein the organic vulcanizing accelerating agent is a sulfenamide accelerator.

12. The composition according to claim 2 wherein the organic vulcanizing accelerating agent is a benzothiazolesulfenamide accelerator.

13. The composition according to claim 2 wherein the organic vulcanizing accelerating agent is a benzothiazy1 amino disulfide.

14. A method of inhibiting premature vulcanization of rubber containing a sulfur-vulcanizing agent and an organic vulcanization accelerating agent selected from the group consisting of thiazoles, diaryl guanidines and thiuram sulfides which comprises incorporating therein 0.10 part to 5.0 parts by weight per 100 parts by weight of rubber of at least one retarder selected from the group consisting of compounds having the following structural formulas:

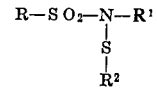

and

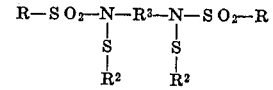

wherein R¹ and R² are selected from the group consisting of chloro, nitro, alkoxy and hydroxy substituted and unsubstituted, saturated and unsaturated hydrocarbon radicals containing one to 20 carbon atoms, wherein R is selected from the group consisting of R¹, R² and

, wherein R⁴ and R⁵ are selected from the group consisting of R¹ and R², R⁴ and R⁵ can be joined through a member of the group consisting of — CH₂ — and — O — to constitute with the attached nitrogen atom a heterocyclic radical, and wherein R³ is selected from the group consisting of chloro, nitro, alkoxy and hydroxy substituted and unsubstituted, saturated and unsaturated hydrocarbon radicals containing one to 20 carbon atoms and wherein R and R¹ can be joined through a hydrocarbon group containing three to 12 carbon atoms to constitute with the — SO₂ — N — group a heterocyclic radical.

15. An accelerator-retarder composition comprising an organic vulcanization accelerating agent selected from the group consisting of thiazole accelerators, aryl guanidine accelerators, organic disulfide accelerators and thiocarbamylsulfenamide accelerators and at least one retarder selected from the group consisting of compounds having the following structural formulas:

and

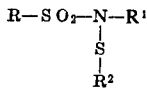
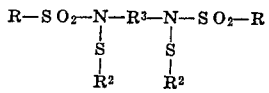

wherein $R^1$ and $R^2$ are selected from the group consisting of chloro, nitro, alkoxy and hydroxy substituted and unsubstituted, saturated and unsaturated hydrocarbon radicals containing one to 20 carbon atoms, wherein R is selected from the group consisting of $R^1$, $R^2$ and

, wherein $R^4$ and $R^5$ are selected from the group consisting of $R^1$ and $R^2$, and $R^4$ and $R^5$ can be joined through a member of the group consisting of — $CH_2$ — and — O — to constitute with the attached nitrogen atom a heterocyclic radical, and wherein $R^3$ is selected from the group consisting of chloro, nitro, alkoxy and hydroxy substituted and unsubstituted, saturated and unsaturated hydrocarbon radicals containing one to 20 carbon atoms and wherein R and $R^1$ can be joined through a hydrocarbon group containing three to 12 carbon atoms to constitute with the — $SO_2$ — N — group a heterocyclic radical.

26. The composition according to claim 2 wherein the retarder is N-(phenylthio)-N-methyl-p-toluenesulfonamide.

* * * * *

PO-1050
(5/69)

UNITED STATES PATENT OFFICE
CERTIFICATE OF CORRECTION

Patent No. 3,678,017          Dated July 18, 1972

Inventor(s) James R. Shelton and Roger J. Hopper

It is certified that error appears in the above-identified patent and that said Letters Patent are hereby corrected as shown below:

Column 13, line 56, after "piperidino" the "and" should be deleted.

Column 16, line 13, "26" should read --16--.

Signed and sealed this 6th day of February 1973.

(SEAL)
Attest:

EDWARD M. FLETCHER, JR.          ROBERT GOTTSCHALK
Attesting Officer                 Commissioner of Patents